Patented May 21, 1935

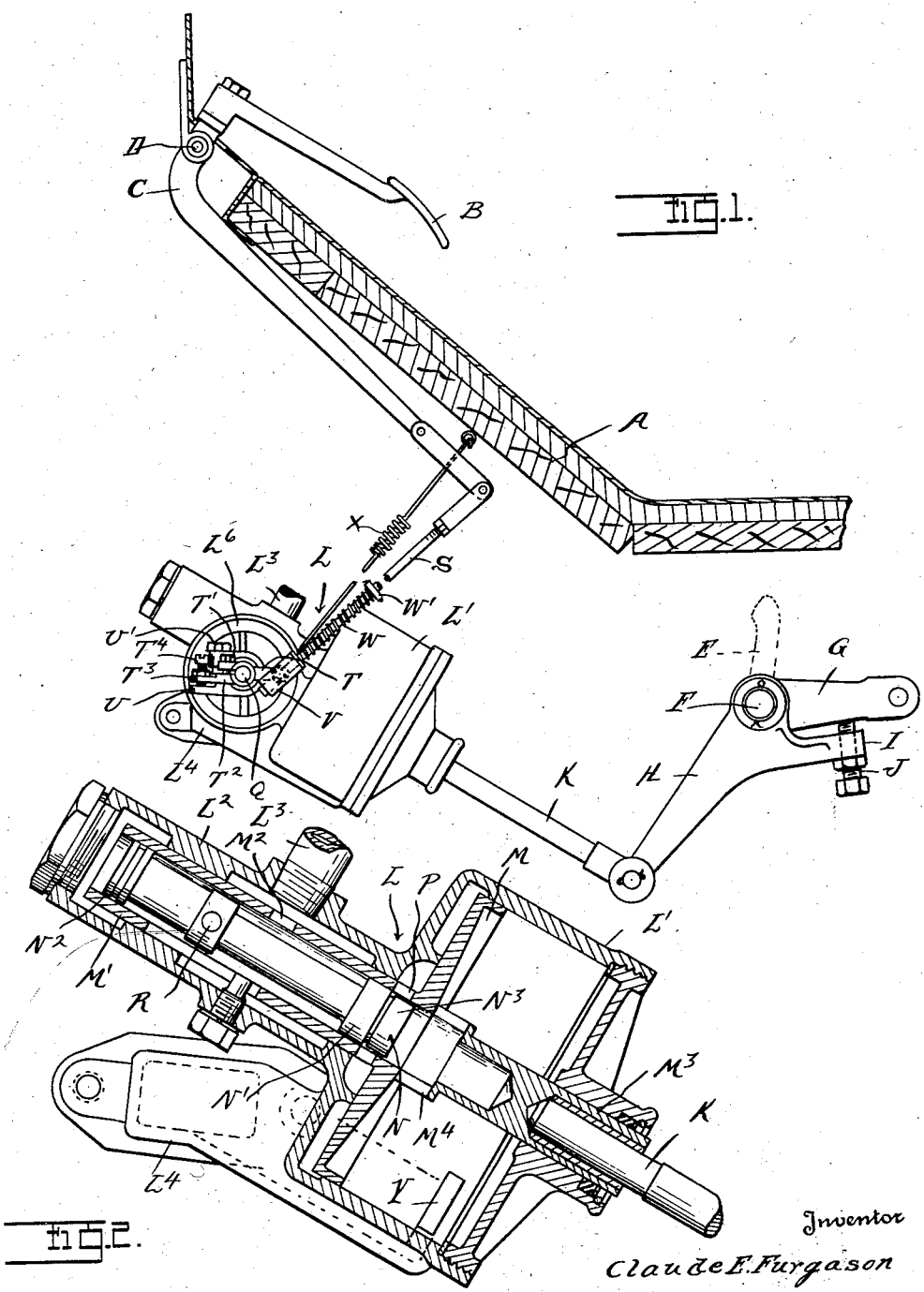

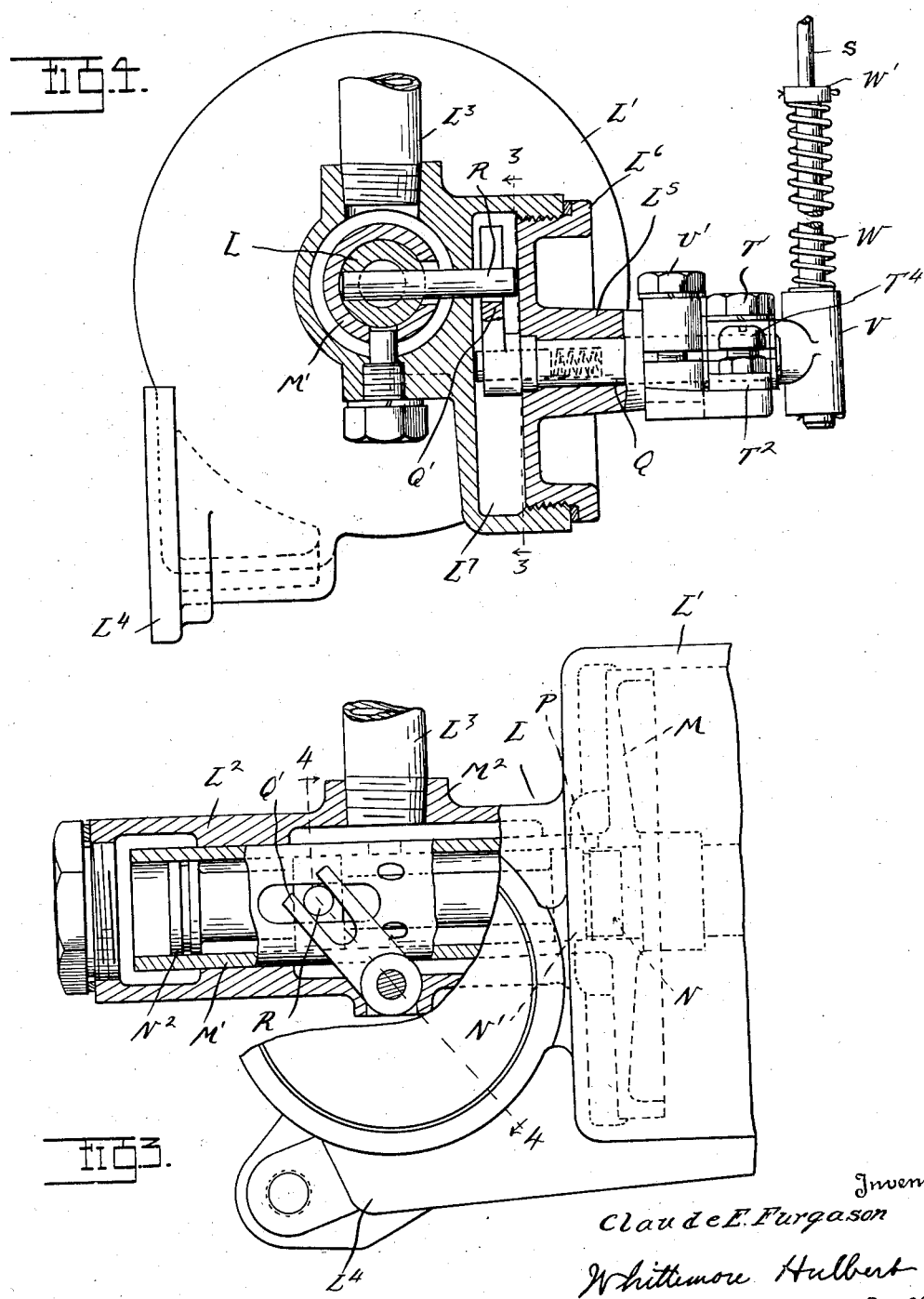

2,002,315

UNITED STATES PATENT OFFICE 2,002,315

HYDRAULIC CLUTCH RELEASE

Claude E. Furgason, Lansing, Mich., assignor to Reo Motor Car Company, Lansing, Mich., a corporation of Michigan Application August 29, 1932, Serial No. 630,932

2 Claims. (Cl. 121—41)

The invention relates to hydraulically actuated clutch release mechanism particularly designed for use on motor vehicles and the invention consists in the novel construction as hereinafter set forth.

In the drawings:

Figure 1 is a sectional elevation showing my improved mechanism in connection with the controlling pedal therefor;

Figure 2 is a longitudinal section through the hydraulic cylinder, piston and controlling valve;

Figure 3 is a section taken substantially upon the line 3—3 of Figure 4, and

Figure 4 is a section substantially on line 4—4 of Figure 3.

My improved releasing mechanism is applicable to any suitable construction of clutch mechanism and I shall therefore omit any specific description or illustration of the clutch, other than to indicate the arm for directly actuating the same. I have, however, shown the relation between the hydraulic mechanism and the controlling pedal therefor. As shown in Figure 1, A is the so-called toe board of a motor vehicle, B is a clutch controlling pedal which is connected to a lever C pivoted at D and extending beneath the toe board substantially parallel thereto. E is the usual forked rock arm for directly actuating the clutch (not shown). F is the rock shaft on which the arm E is mounted and G is an actuating arm or lever for said rock shaft. The arm G is itself actuated by an arm H swiveled on the shaft F and provided with an extension I and a set screw J for adjustably engaging the arm G. K is a rod pivotally connected to the arm H and extending to the hydraulic release mechanism, which is of the following construction:

L is a casing including a cylindrical portion L' which contains a piston M. This piston is provided with a tubular stem M' which slidably engages a cylindrical extension L² of the casing L. L³ is a conduit connected with a portion L² and leading from a source of liquid under pressure, such as the pressure line of the lubricating system for the motor. L⁴ is a bracket extension of the casing L which is adapted to be mounted upon the motor housing (not shown) and through which the exhaust oil is returned to the oil pan or sump of the motor.

Within the hollow stem M' of the piston is arranged a piston pilot valve N. N' is a head at one end of the valve which cooperates with ports P in the tubular stem M' to control admission or exhaust of the pressure fluid to the cylinder L' in rear of the piston M. The valve N is balanced by a head N² at the opposite end thereof and the pressure oil is admitted to the stem between said heads through a port M². The casing L is also provided with a lateral extension L⁵ preferably integral with a screw threaded cap L⁶ which closes a chamber L⁷ at one side of the casing extension L². Q is a rock shaft journaled in the extension L⁵ and provided at its inner end with a slotted rock arm Q' movable within the chamber L⁷. R is a pin projecting laterally from the pilot valve N and engaging the slotted arm Q'. The arrangement is such that the rocking of the shaft Q will through the arm Q' and pin R actuate the valve N longitudinally within the tubular stem M'. S is a rod connecting the end of the lever C with a rock arm on the shaft Q for actuating the latter. To provide for adjustment the shaft Q has secured thereto a rock arm T which is clamped to the shaft by the screw T'. Extending diametrically opposite from the arm T is the arm T² which carries an adjustable set screw T³ for engaging a stop formed by an arm U adjustably secured to the extension L⁵ by a clamping screw U'. The rock arm T has a swivel connection with a sleeve V for slidably receiving the rod S and a spring W upon said rod engaging a collar W' thereon bears against the sleeve V to yieldably operate the same.

With the construction as thus far described, the operation is as follows: When the operator presses upon the pedal D this will actuate the lever C and rod S to rock the arm T and shaft Q which latter through the medium of the rock arm Q' and pin R will actuate the pilot valve N longitudinally in the tubular sleeve N'. If this actuation is sufficient to move the head N' inward beyond the port P, this will admit fluid under pressure through the port P into the cylinder L' in rear of the piston M, moving the latter forward. A forwardly extending stem M³ of the piston M bears directly upon the rod K which engages a recess in the end of said stem and thus movement of the piston is communicated to said rod and through the levers H, I, set screw J, rock arm G and forked lever E will actuate the clutch. As soon as the piston M moves forward it will advance the ports P in relation to the head N' so as to again cut off communication between the interior of the hollow stem M' and said ports. Thus the amount of advancement of the piston is dependent upon the advancement of the pilot valve.

When the pressure on the pedal B is released, it will be returned to its normal position by the operation of a spring X attached to the rock arm and its shaft Q will also be returned to normal position where the arm $T^3$ is stopped by engagement with the stop arm U. Adjustment of this stop position may be effected by a set screw $T^4$ in the end of the arm $T^3$ which directly bears on the stop arm U. The return movement of the rock shaft Q will cause the rock arm Q' and pin R to move the valve N back to its initial position, thereby permitting the fluid in rear of the piston to escape through the hollow stem $M^3$ and ports $M^4$ into the chamber on the opposite side of the piston. This chamber is connected by a port Y with a passage leading through the arm $L^4$ which returns the fluid to the oil pan or sump of the engine. However, to prevent a too sudden return movement of the piston, the passage through the hollow stem $M^3$ is restricted by a head $N^3$ on the valve in advance of the head N' and which is of slightly smaller diameter than the bore of the hollow stem. Thus the oil can escape through the clearance around the head $N^3$ but is sufficiently retarded to properly control the speed of the return movement.

The construction just described is one which is easy to manufacture, is easily assembled and adjusted and which effectively controls the application of the hydraulic power to the operation of the clutch.

What I claim as my invention is:

1. An hydraulic unit comprising a cylinder, a piston in said cylinder, a hollow stem for said piston extending therethrough and on opposite sides thereof being provided with ports on opposite sides of said piston, a connection between one end of said stem and the actuated member, an extension of said cylinder on the opposite side of said piston forming an oil pressure chamber surrounding said hollow stem and in communication with the interior thereof, a piston pilot valve within said hollow stem, and actuating means for said pilot valve in a direction axially of said hollow stem comprising a pin projecting from said valve extending through a slot in said hollow stem, a rockable lever engaging said pin to actuate the same, a fluid tight chamber in which said rockable lever is located, a rock shaft for said rockable lever extending out from said fluid tight chamber, and a manually operable control member for rocking said rock shaft.

2. An hydraulic unit comprising a cylinder, a piston in said cylinder, a hollow stem for said piston extending therethrough and upon opposite sides thereof with ports upon opposite sides of said piston, a push rod connection between one end of said stem and the actuated member, an oil pressure chamber surrounding said stem upon one side of said piston and in communication with the interior thereof, an exhaust for said cylinder on the opposite side of said piston, a piston pilot valve in said hollow stem normally in the position to close the port on the pressure side of said piston and restricting the passage through said hollow stem to the port on the opposite side of the piston, and means for actuating said pilot valve axially of said hollow stem in one direction to connect said port with the pressure chamber and in the opposite direction to connect the ports on opposite sides of the piston through the restricted passage whereby the movement of said piston will follow the movement of said pilot valve and restore the same into neutral relation thereto and whereby the return movement of the piston is retarded by the restriction in the passage between ports.

CLAUDE E. FURGASON.